United States Patent
Horst et al.

(10) Patent No.: US 6,549,977 B1
(45) Date of Patent: Apr. 15, 2003

(54) USE OF DEFERRED WRITE COMPLETION INTERRUPTS TO INCREASE THE PERFORMANCE OF DISK OPERATIONS

(75) Inventors: Robert W. Horst, Saratoga, CA (US); Christophe Therene, Livermore, CA (US)

(73) Assignee: 3ware, Inc., Palo Alto, CA (US)

( * ) Notice: Subject to any disclaimer, the term of this patent is extended or adjusted under 35 U.S.C. 154(b) by 28 days.

(21) Appl. No.: 09/863,520

(22) Filed: May 23, 2001

(51) Int. Cl.[7] .............................................. G06F 13/00
(52) U.S. Cl. ...................... 711/113; 711/118; 711/135; 711/156; 714/14; 714/22
(58) Field of Search ..................... 710/58, 52; 711/113, 711/118, 135, 156; 714/22, 14

(56) References Cited

U.S. PATENT DOCUMENTS

| | | | |
|---|---|---|---|
| 4,811,203 A | * 3/1989 | Hamstra | 711/142 |
| 5,586,248 A | * 12/1996 | Alexander et al. | 714/22 |
| 5,596,708 A | * 1/1997 | Weber | 714/6 |
| 5,774,643 A | * 6/1998 | Lubbers et al. | 714/20 |
| 6,401,149 B1 | * 6/2002 | Dennin et al. | 710/58 |

OTHER PUBLICATIONS

"Applicants' Statement" as provided on the Information Disclosure Statement filed Jul. 19, 2001.

* cited by examiner

*Primary Examiner*—T. V. Nguyen
(74) *Attorney, Agent, or Firm*—Knobbe, Martens, Olson & Bear LLP

(57) ABSTRACT

A disk array controller reliably improves performance in RAID configurations without the need for a battery backup. Write completion interrupts are queued until a write cache flush has been performed and are then sent to a host system. States of ranges of disk addresses (activity bins) are stored in nonvolatile storage elements associated with the ranges. The states allow rebuild times to be reduced after power failures and drive failures. A range is in a Changing state if at least one of the addresses is the target of a write operation that has been initiated but not completed. The range is in a Stable state if no addresses are the target of an uncompleted write operation. Two additional states are used to identify ranges of disk addresses that have been zeroed or never been written to. The additional states allow substantial reductions in RAID volume creation times.

12 Claims, 13 Drawing Sheets

USE OF DEFERRED WRITE COMPLETION INTERRUPTS TO INCREASE THE PERFORMANCE OF DISK OPERATIONS

BACKGROUND OF THE INVENTION

1. Field of the Invention

The present invention relates generally to Redundant Arrays of Inexpensive Disks and more particularly, the invention relates to technology for increasing the performance of these disk arrays.

2. Description of the Related Art

Disk arrays provide vast amounts of storage as well as flexibility in speed and reliability. These arrays are often configured to operate as Redundant Arrays of Inexpensive Disks, otherwise known as RAID arrays, to provide added speed and reliability. Existing RAID arrays, however, suffer from various deficiencies.

In order to assure reliability in the event of unexpected power failures, high-performance RAID arrays generally require a battery backup or uninterruptable power supply (UPS). Existing systems are typically configured such that the host is informed that a write has been completed once the write data has been written to a write cache of a disk drive or an array controller. The danger is that power can be lost after the data has been written to the cache but before the data has been written to disk. The battery backup allows cached write data to be maintained until power is restored so that the cached write can be completed. An UPS allows extra time for a write to be completed before power is finally lost. An UPS or a battery backup, however, adds substantially to the initial cost of a RAID array.

As an alternative to using a battery backup, some systems disable write caching. With write caching disabled, the host is informed that a write has been completed only after the write data is actually written to the disk media. This approach is safe, but has poor performance. With the write cache off, when a write is sent to the drive, the drive must wait for the correct location to be under the write head, then complete the write operation and return the completion interrupt. When writes are sequential, the next write arrives just after the correct sector has passed under the head, and an entire disk revolution can be lost. Empirical measurements of a Quantum LM drive have shown that the streaming write performance (with 64 KB writes) drops to 5.9 MB/s with write cache disabled compared to 25.6 MB/s with write cache enabled. Even with a battery backed up external write cache, there is no way to recover the lost performance because there is no queuing of writes at the drive.

The consistency of a RAID array that lacks an UPS or battery backup may also be compromised if a power failure occurs during a write operation. The consistency problem occurs when only a portion of a write operation is completed before a power failure, which may leave portions of an array out of synchronization. This consistency problem occurs even if all write caching is permanently disabled. Existing RAID controllers handle this situation in different ways. Some low cost storage systems just ignore the problem, in which case an UPS may be required in order to ensure system reliability. Other systems detect an "unclean shutdown" by setting a bit in nonvolatile storage (e.g., on a disk) during normal operation and clear the bit when the operating system shuts down normally. If power is lost, the unclean-shutdown bit remains set and can be used to initiate a rebuild of the entire RAID array. The rebuild of the array restores consistency to the array by recreating a mirror disk (RAID 1) or a parity disk (RAID 5), for example. A rebuild of the array, however, is a typically a time consuming operation. For example, a full rebuild of a RAID 10 array with eight 75 GB drives can take on the order of 2.7 hours at 30 MB/s. Furthermore, during the rebuild, if one of the drives of the array fails, data can be permanently lost.

The disk drives used in RAID arrays, like all disk drives, are also susceptible to failure. In the case of a drive failure, previous RAID controllers have been configured to rebuild the entire failed drive based upon the data in the remaining drives. This rebuild process is generally time consuming, and the array is susceptible to data loss in the case another drive fails during the rebuild process.

When initializing or creating a RAID array unit, all of the disks of the array are typically zeroed before the array can be used. Zeroing involves writing zeros to all of the storage locations on the array. The zeroing process is performed in order to create an array that is compliant with the RAID standard under which the array is operating. Depending on the particular RAID array, this zeroing process during unit creation can sometimes take several hours.

The present invention seeks to address these problems among others.

SUMMARY OF THE INVENTION

In one aspect of the invention, write performance is increased over systems that disable the write cache. In order to improve write performance, the write cache is enabled, but completion interrupts are deferred and queued in a Pending Completion Write Queue until a flush of the write cache is completed. After a flush has been completed, it can be assured that any cached data has been written to disk. A completion interrupt is not sent to the host system before the write command is actually completed and falsely transmitted completion interrupts just prior to power failures are avoided. The drive caches are therefore safely used to coalesce writes and increase performance.

In another aspect, rebuild times are improved. The address range of the array is divided up into a number of activity bins where each activity bin represents a subset of the address range of the disk drive. For each activity bin, activity data descriptive of disk activity targeted to the corresponding activity bin is preferably stored in a corresponding memory element in a binmap, which is maintained in a nonvolatile RAM (NOVRAM). Alternatively, the binmap can be maintained on one or more of the disk drives. A relatively small number of activity bins (e.g., 64 bins representing a drive's entire range of addresses) can be used to log enough disk activity information to achieve substantial increases in performance during rebuilds.

In one embodiment, each activity bin can take on one of two states where the state is maintained by a bit in the binmap. An activity bin is set to a Changing state if at least one of the addresses in the activity bin is the target of a write operation that has been initiated but not completed. The bin is in a Stable state if no addresses are the target of an uncompleted write operation. After a power failure, activity bins in a Changing state are rebuilt and activity bins in a Stable state can be skipped. Rebuild times can be reduced drastically after a power failure if few bins are in the Changing state.

In one configuration, two binmaps are used to store state information for activity bins. Each time a write operation is received, the corresponding memory elements in each binmap are set to represent the Changing state. Periodically, after an amount of time that is longer than the longest time needed to complete a write operation, an alternate one of the bitmaps is reset such that all of the bins are in the Stable state. The bitmaps are therefore reset in alternating ping-pong fashion. Accordingly, at least one of the binmaps always contains at least a period's worth of activity data that can be used to effect a rebuild of any Changing bins.

In another configuration, a single binmap is used. The binmap is cleared each time a cache flush is performed. A cache flush assures that all pending writes have been completed and therefore any Changing bins can be reset to Stable.

In one embodiment, two additional states are used to reduce array unit creation times. Upon creation of a unit, all of the activity bins are set to an empty state at which time the unit is brought on line. Accordingly, an array unit can be brought on line nearly instantaneously. In contrast to prior techniques, the zeroing of the whole array, which may take up to several hours, need not be performed before the array is brought on-line. Instead, activity bins can be zeroed on demand, before the first write to each bin, and in the background. As each bin is zeroed, it is set to the Zero state. Activity bins are set to Changing and Stable states in accordance with the above-mentioned embodiments.

Array rebuild times after a drive failure can also be reduced. In accordance with one embodiment, only bins in changing or stable states are rebuilt after a drive failure. Any bins in Empty or Zero states can be skipped during the rebuild process since these bins contain no valid data. It is often the case that a disk drive will contain valid data on a small portion of its complete address range. Accordingly, when a disk is only partially full, substantial reductions in rebuild times after drive failures can be achieved.

Activity bins can also be used to increase the performance of certain read operations. In the case an activity bin is in a Zero state, it is known that all of the data in the bin is equal to zero. Accordingly, zeros can be returned without performing a read of the disk media.

In one embodiment, activity bins are associated with display elements on a display configured to spatially indicate the relative locations of disk operations on disk drives.

In one embodiment, a RAID array includes two or more disk drives, a binmap, and a processor. The binmap includes two or more storage elements maintained in a nonvolatile memory and each storage element is associated with an activity bin. The processor is configured to operate the disk drives in a RAID configuration, map disk addresses to activity bins, and store disk activity data in the binmap.

DETAILED DESCRIPTION OF THE EMBODIMENTS

The detailed description is organized into the following sections:
  I. The Disk Array
  II. Deferred Flush Write Optimization
    A. Prior Techniques
    B. Deferring Completion Interrupts
    C. Flush Timing
    D. Example Implementation
    E. Performance
  III. Activity Bins
    A. Implementation of the Binmap
    B. Handling Multiple Drives
    C. Example Mapping Schemes
  IV. Reducing Rebuild Times After a Power Loss
    A. Problem Description
    B. Prior Techniques For Maintaining RAID Consistency
    C. Logging of Outstanding Writes
    D. Use of Activity Bins
  V. Reducing Unit Creation Times
    A. Bin States
    B. Fast Unit Creation Method
    C. Additional Methods
    D. Performance
  VI. Conclusion In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention. As will be apparent, many of the disclosed features can be used or practiced independently of others, and in addition, many of the inventive features that are described separately can be combined in various combinations in different embodiments.

I. The Disk Array

Figure 1:
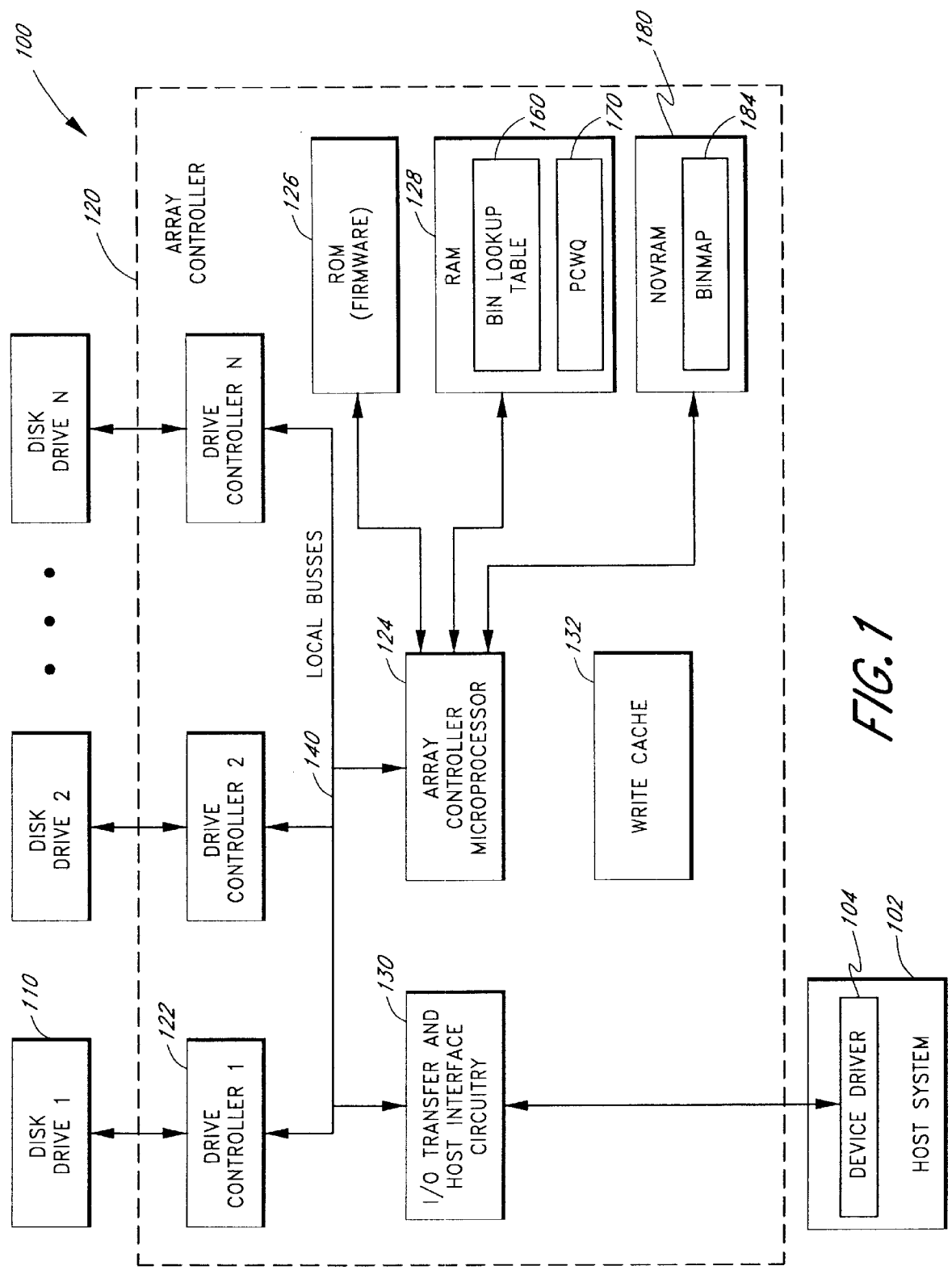
FIG. 1 is a general illustration of a disk array system configured in accordance with one embodiment of the invention.

FIG. 1 is a general illustration of a disk array system 100 configured in accordance with one embodiment of the invention. The disk array system 100 is preferably configured to perform methods that provide increased performance and reliability. These methods are described in the sections that follow. In general, practically any type of disk and/or disk array can be configured according to the methods of the present invention. In the illustrated system, however, the disk array 100 is an array of ATA disk drives. The disk array may alternatively be an array of SCSI drives. The array is preferably operated in a RAID configuration but can be operated in a Just a Bunch Of Disks (JBOD) configuration, or in another configuration.

The disk array 100 includes one or more disk drives 110 (numbered 1–N), which are controlled by an array controller 120. The array controller 120 preferably controls the configuration in which the disks operate (e.g. JBOD, RAID 1, RAID 5), and connects the disk array to a host system 102, which may be a central processing unit, a server computer, network attached storage box, or another type of computer system. In one embodiment, the disk array can be integrated with and part of the host system 102 or as part of a server system. In one embodiment, a single disk drive and controller unit can be used in place of the disk array. In this case, the functionality of the drive controller 122 and the array controller 120 can be combined.

The array controller 120 preferably includes several drive controllers 122 (numbered 1–N) that directly control the individual disk drives. In certain configurations, such as SCSI, one drive controller 122 may control several disk drives 110. The drive controllers 122 are in turn controlled by an array controller microprocessor or microcontroller 124. The microprocessor 124 identifies disk operation requests by the host system and implements the requests through the components of the array controller 120. The microprocessor 124 executes firmware code that is stored in a ROM (Read Only Memory) 126 to which the microprocessor has access. The firmware code preferably defines the particular functionality of the disk array 100 (e.g., RAID 1 or RAID 5). Although certain RAID configurations are used as examples herein, the features of the invention can be used with other configurations. The microprocessor 124 also has access to a RAM (Random Access Memory) 128 that it uses as a working memory. The components of the array controller 120 are preferably internally connected through one or more local busses 140. The array controller 120 may be constructed and may operate as generally described in PCT application WO 9926150A1, the disclosure of which is hereby incorporated by reference.

A write cache 132 is preferably used to cache data after it has been received from the host system 102 and before it has been written to the disk media. In one embodiment, the write cache is incorporated into the array controller. Additionally or alternatively, each disk drive 110 can be configured with a separate write cache.

In one embodiment, the address range of the array 100 is divided up into a number of activity bins where each activity bin represents a subset of the address range of the array. The address ranges corresponding to the activity bins are preferably mutually exclusive and each address range is preferably but need not be contiguous. A relatively small number of activity bins (e.g., 64 bins representing n array's entire range of addresses) can be used to log enough disk activity information to achieve substantial increases in performance during rebuilds. In accordance with this embodiment, since contiguous array addresses may be "striped" across several separate disks in the array, an activity bin can represent a stripe of addresses across several disks. In an alternative embodiment, activity bins are associated with address ranges at the disk drive rather than at the array level and each activity bin represents a subset of the address range of the disk drive.

The microprocessor 124 preferably stores an activity bin lookup table 160 in the RAM memory 128. The activity bin lookup table, discussed in additional detail in Section III below, is used to map array or disk addresses (of disk operations) to activity bins.

For each activity bin, the microprocessor 124 preferably stores activity data descriptive of disk activity targeted to the corresponding activity bin. The activity data for each activity bin is preferably stored in a corresponding memory element in a binmap 184, which is maintained in a nonvolatile RAM (NOVRAM) 180. Alternatively, the binmap 184 can be maintained on one or more of the disk drives 10. In one embodiment, the activity bin lookup table can be configured to map disk addresses directly to memory elements in the binmap 184 rather than to activity bins. The form of the activity data and associated methods will be discussed in additional detail in the sections below.

In one embodiment, write completion interrupts for write operations that have been sent to the write cache 132 are queued in a Pending Completion Write Queue 170 (PCWQ) until a cache flush is performed. The microprocessor 124 preferably creates and maintains the PCWQ 170 in the RAM 128. The PCWQ 170 is discussed in additional detail in Section II below.

The host system 102 may communicate with the array controller 120 through input/output (I/O) transfer and host interface circuitry 130 ("host interface"). The connection to the host system 102 may be through a bus, such as a PCI bus. The connection to the host 102 may alternatively be through a computer network and may include a network interface controller. The host system 102 preferably executes a device driver 104, through which the host system 102 interacts with and controls the disk array 100.

The array controller 120 is preferably configured to perform methods that increase the performance of the disk array system 100 without the need for a battery backup or UPS. These methods, which are described in the sections that follow, enable: an increase in write performance over systems that disable the write cache, a reduction in rebuild times when writes are interrupted by power failure, and a reduction in rebuild times subsequent to drive failure. As will be understood by one skilled in the art, the discussed methods can be implemented independently of one another, in which case only some of the benefits may be achieved.

II. Deferred Flush Write Optimization

This section discusses one aspect of the invention in which the transmissions of completion interrupts to the host system for write operations are deferred until a flush of the write cache is completed. This feature provides an increase in performance over disabling the cache without requiring the use of a battery backup.

A. Prior Techniques

When a RAID subsystem is connected to a host machine through a network connection, data being written to the disk drives may be cached in multiple places: the host memory, a network processor memory, the RAID controller buffers, and/or the write cache. All of these caches have different implications in performance and chance of data loss. One design decision that affects the performance of RAID systems is the choice of when the host is to be informed that a write has been successfully completed. To increase performance, it is possible to send the completion interrupt or other completion notification when write data has been saved in a cache. The danger is that a power failure can occur after the completion has been sent but before the data has been written to the disk media. If this is not handled properly, the host can receive a false indication that a write has been completed when it actually has not.

Approaches with good streaming performance leave the write cache enabled, but protect data sent to the drive's write cache against power loss. One technique is to use an uninterruptible power supply to power the drives and controller long enough to complete all pending writes after a power fail. The main drawback of this approach is that the batteries required to power multiple disk drives are physically large. The full box UPS, however, actually complements the preferred embodiment, because it handles transient power events and allows a large controller cache that is nearly as safe as forcing writes to the media.

Another approach is to back up the write cache until power is restored. This technique typically requires powering a large memory for at least several days. Even with a medium-size battery, the battery capacity can be exceeded, causing data to be lost.

Yet another approach is to have a battery that powers the external write cache and controller just long enough to save the cached write data in nonvolatile storage such as flash memory. This technique typically requires a medium to small battery, but uses expensive nonvolatile storage equal to the size of the write cache.

Another problem with techniques that leave the write cache enabled is that they are susceptible to hardware failures of the cache, batteries or control logic. If any of these fail while an acknowledged write is still pending, those updates are permanently lost. To be fault tolerant, this problem typically requires either a fully fault-tolerant controller, or mirroring or data replication across multiple storage subsystems.

B. Deferring Completion Interrupts

In order to improve write performance in accordance with one aspect of the invention, the write cache is enabled, but completion interrupts are deferred and queued in the Pending Completion Write Queue (PCWQ) 160 (FIG. 1) until a flush of the write cache is completed. The drive caches are therefore safely used to coalesce writes and therefore increase performance. Whenever the host runs out of writes to give to the controller, the controller issues flush commands to the drives. When the flushes are finished, the controller sends the queued completion interrupts to the host. With enough write data queued, the cost of the extra flushes is negligible and performance is nearly the same as with the otherwise unsafe write cache on. This aspect can be implemented in either the device driver or the firmware. The firmware implementation is preferred because it has better performance and is OS-independent. The required firmware is much less complex than the firmware typically used to manage a battery backed-up cache.

C. Flush Timing

An important design decision is the choice of when to issue the flush commands. A flush is preferably performed whenever there is a queued write and the host has run out of commands to send to the storage controller. This situation can be detected by a timer that fires a short time, such as 0.5 milliseconds, after the last command was received from the host. The host can run out of commands as a result of either the device driver reaching its maximum queue depth (typically 256), or as a result of a host application running out of work to do before receiving a completion interrupt. In order to detect the situation when the host has run out of work or the queue depth being reached, the timer can be configured to fire at an expected maximum amount of time between commands.

At least one more trigger for flushes is preferably used to cover the case of mixed reads and writes. Without another trigger, a single write could be followed by an indefinite number of reads that would successfully complete, but the write interrupt would incur an enormous latency. This case can be handled by a read counter or an elapsed time counter.

The read counter allows at most M reads to complete while one or more write completions are queued. M is preferably set in the range of about 5–100. Increasing M increases the latency of writes, but allows more writes to be grouped under one flush in the case where there are many reads and writes intermixed. Decreasing M improves latency at the possible expense of write bandwidth. The value of M is preferably left as a variable at least until benchmarks have been run in an actual implementation.

The elapsed timer is preferably a timer that expires N ms after the first write completion interrupt has been queued. The timer might be set in the range of 100 ms to several seconds. The time is preferably great enough to allow multiple writes to be queued (and possibly reordered). For example, in an online transaction processing (OLTP) application, 100 outstanding input/output (I/O) commands at 10 ms each would take 1 second.

The elapsed timer serves a similar function to the read counter, but it may be difficult to find a setting that gives good random performance without making latencies too long for isolated writes. The read counter may be a better solution, because the threshold can be set fairly low to handle the isolated write case, yet not affect streams of random writes that get best performance when limited only by the number of outstanding writes are sent from the driver.

Read operations that take an abnormally long time to complete can be held up behind writes that are being written to the media. To address this problem a flush can also be performed when read time exceeds a threshold. This can reduce latency for some isolated writes.

D. Example Implementation

Figure 2:
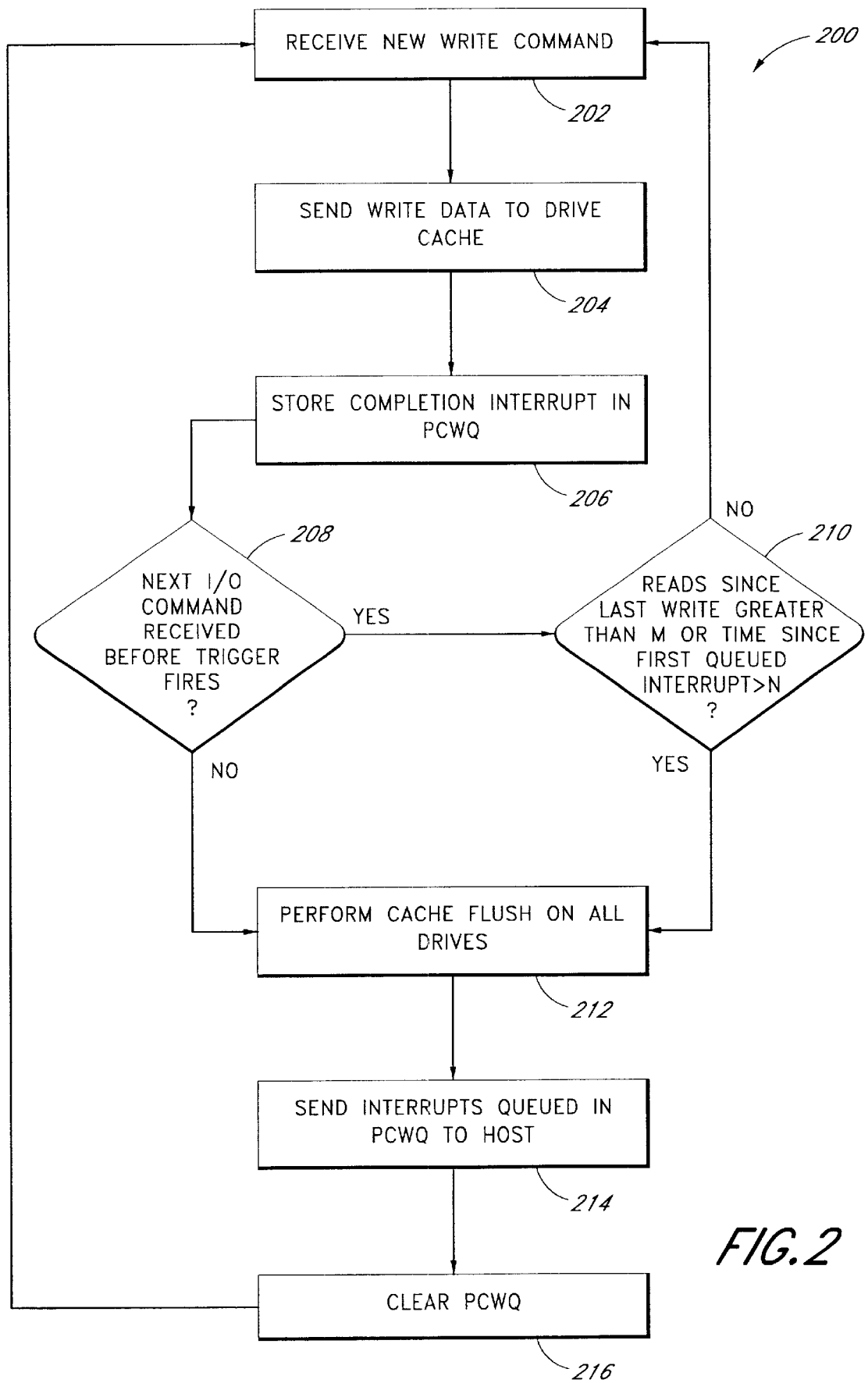
FIG. 2 illustrates a method for implementing deferred flushes in accordance with one embodiment.

FIG. 2 illustrates a method 200 for implementing deferred flushes in accordance with one embodiment. The method 200 is preferably performed by the array controller 120 based upon firmware code stored in the ROM 126. Alternatively, the method 200 can be performed based upon application specific logic circuitry. The method 200 can also be performed partially or wholly by the device driver 104 of the host system 102.

At a step 202, the array controller 120 receives a new write command from the host 102. In one embodiment, the write command is received from the device driver 104 by the host interface 130.

At a step 204, the array controller sends the write data to one or more of the drive caches. In one embodiment, each drive controller 122 has a cache for the respective drive. A write command generally involves writing data to each of the drives in the array and therefore write data is sent to each drive controller 122 to be cached. In some RAID configurations, however, not all drives are written simultaneously.

At a step 206, the array controller stores a completion interrupt (or an interrupt request) in the Pending Completion Write Queue (PCWQ) 170. Since the interrupt itself is really an event or signal sent by the array controller, information based upon which the array controller can eventually cause the completion interrupt is preferably stored in the PCWQ 170.

At the decision step 208, the array controller determines whether the next I/O command is received before the trigger fires (e.g., 0.5 ms). The array controller can make this determination by restarting a timer upon receipt of I/O command and determining whether the timer expires before receipt of the next I/O command. If the next I/O command is received before the timer expires, control flows to the step 210. Otherwise, if the timer expires and the next I/O command has not been received, control flows to a step 212.

At the decision step 210, the array controller determines whether the number of reads since the last write is greater than a limit M. Alternatively or additionally, the array controller determines whether the time since the first queued interrupt is greater than N. The limit M, described above, is preferably set in the range of about 5–100. The number N is preferably set in the range of 100 ms to several seconds. If either outcome is positive, controls flows to the step 212. Otherwise, control flows back to the step 202 for the processing of a new write command At the step 212, the array controller performs a cache flush on all of the drives in the array. The cache flush causes each drive to force all of the data in its respective cache to be written to disk before the flush is completed. Accordingly, completion of the flush assures that no write data is remaining in any of the caches.

At a step 214, the array controller sends any interrupts queued in the PCWQ to the host. Since the caches have already been flushed, all of the data corresponding to each of the write completion interrupts in the queue has already been written to disk. Therefore, each of the queued interrupts can be safely sent to the host.

At a step 216, the array controller clears interrupts from the PCWQ. The step 216 is preferably performed after the step 214 to allow confirmation that the interrupts have been received and/or processed before they are cleared. In one embodiment, the steps 214 and 216 can be performed in sequence for each interrupt. For example, each interrupt can be cleared from the queue as it is sent from the array controller to the host. Alternatively, all of the interrupts can be first processed at the step 214 and then they can be cleared at the step 216. From the step 216, control flows back to the step 202 for receipt of a new write command.

E. Performance

The performance of the deferred flush technique should equal or exceed that of a controller that disables caching completely. The potential performance gains are particularly significant in applications that require good streaming performance, such as backups or video writes.

III. Activity Bins

In accordance with one aspect of the invention, the logical address space of an array is divided into a number of activity bins for the purpose of tracking disk usage. Each activity bin represents a preferably contiguous subset of the address range of the array. A relatively small number of activity bins (e.g., 64 bins representing an array's entire range of addresses) can be used to log enough disk activity information to achieve substantial increases in performance during rebuilds. A larger memory with more bins can used to further reduce rebuild times.

Each activity bin is associated with a memory element in which activity data descriptive of disk activity targeted to the corresponding activity bin is stored. The memory elements are preferably arranged in a binmap 184, which is maintained in nonvolatile storage.

In the embodiments discussed in the sections below, each storage element in the binmap includes one or two bits of nonvolatile memory. In other embodiments, each storage element can include more than one or two bits (e.g., one or more bytes).

A. Implementation of the Binmap

The binmap 184 is maintained in nonvolatile memory in order to preserve accumulated disk activity data in the event of a power failure. Each bit or storage element in the binmap is preferably used to store the state of one activity bin. Using 64 bins for a 64 GB drive maps 1 GB to each bin. A larger memory allows the states of more bins to be stored, resulting in a finer granularity and hence a faster rebuild time.

The nonvolatile memory can be an SRAM with small lithium battery, an autostore NOVRAM that has both SRAM and flash, or even a small amount of the disk configuration blocks on the drives themselves. Examples of memory devices that can be used include the XICOR X24C45 serial autostore NOVRAM, the X20C16, and the Ramtron ferroelectric nonvolatile RAM. Some nonvolatile memory devices have a limited write-cycle durability. To account for repeated writes, banks of memory devices can be used in conjunction with wear-leveling algorithms to increase the expected life of the array.

In one embodiment, a disk configuration block can be used for the nonvolatile storage. By using the disk configuration block, a separate NOVRAM need not be used. In one embodiment, an entire 512 byte sector is used to represent each element in the binmap 184. By using an entire sector to hold the one or two bits for an activity bin, only a write is necessary to update an activity bin rather than a more time consuming read-modify-write. If only 64 activity bins are used, only 64 sectors (32 KB) of space is required to represent the entire binmap. The binmap is preferably stored redundantly on two or more drives.

Depending on the type of nonvolatile memory used, it may be advantageous to have a memory copy of the binmap 184 in the RAM 128 to accelerate the reading of the binmap 184. The memory copy of the binmap 184 need only be copied to the NOVRAM 180 when the binmap 184 changes. This approach provides a performance benefit because multiple writes to the same region do not require separate updates to the nonvolatile memory. It also greatly reduces the number of writes to nonvolatile storage with limited write cycle durability.

B. Handling Multiple Drives

In accordance with one embodiment, if all of the drives are identical, a single binmap 184 be used to handle multiple drives. In this embodiment, a single activity bin can be used to represent a parallel/mirrored address range "striped" across all the drives and the activity data for the range on all of the drives can be stored in a single memory element in the binmap. Any activity on any drive for the corresponding range of addresses can then be recorded in association with the single bin. In this manner, drive activity for a range of addresses for all of the drives is merged into a single memory element.

In another embodiment, all of the addresses of all of the drives can be mapped to one or more binmaps such that the same address ranges on different drives are mapped to different memory elements. A separate binmap 184 can be used for each drive. Alternatively, the bins can be partitioned among the drives in an array. Separate hashing functions can be used for the different drives but the hashing functions can be targeted at the same set of bins.

C. Example Mapping Schemes

This subsection describes several methods for mapping disk addresses to activity bins. These methods are preferably performed by the array controller microprocessor 124 to associate disk address ranges with activity bins. In accordance with the aspects of the invention described in the sections that follow, the microprocessor 124 stores disk activity data in association with each activity bin, which in turn, can be used to reduce array rebuild times. A number of methods for mapping disk operations to activity bins are disclosed in U.S. patent application Ser. No. 09/634,744, filed on Aug. 9, 2000, the disclosure of which is hereby incorporated by reference.

The following description assumes that 64 activity bins are used. Other numbers of activity bins can alternatively be used.

Although the following description refers particularly to disk addresses, the methods disclosed are applicable to either disk addresses or array addresses. In one embodiment, the entire range of addresses in the array is divided up into a number of activity bins and the identification of the activity bin is performed based upon the array or volume disk address. In another embodiment, the address range of each disk is broken up into activity bins and the identification of the activity bin is performed based upon the disk address. Disk addresses are typically determined by the array controller based upon array addresses. Either technique can be used to achieve the same result.

The following description also assumes that disk addresses (or array addresses) are specified using logical block address (LBA) format, although other formats such as cylinder-head-sector (CHS) could be used. An LBA is a value that identifies a sector on a disk and typically has a length of 4 bytes. The sectors of a disk are mapped to LBA values in sequence from 0 to the highest LBA on the disk or array.

1. Bit Masking Method

Figure 3:
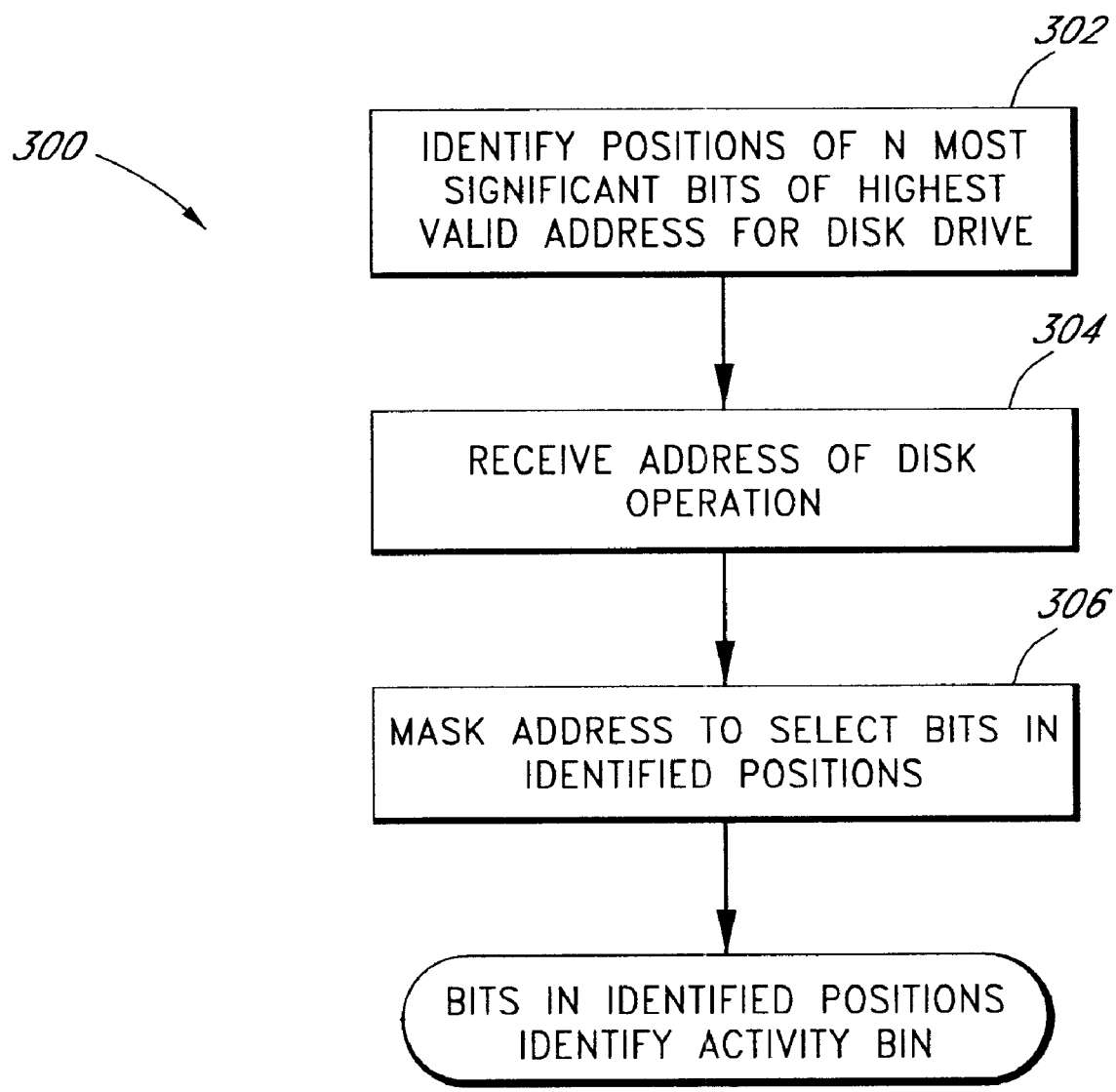
FIG. 3 illustrates one method for mapping disk addresses to activity bins.

FIG. 3 illustrates a bit masking method 300 for mapping disk addresses to activity bins. At a step 302, the positions of the N most significant bits are identified for the highest valid address for the disk drive. N is equal to the number of bits necessary to uniquely identify each of the activity bins. For example, it takes 6 bits to identify 64 activity bins, so N equals 6 in this case. The step 302 need only be performed once, such as during the initialization or setup of a system.

At a step 304, the address of a disk operation is received. At a step 306, the address of the disk operation is masked to select the bits in the identified bit positions. The bits in the identified bit positions of each disk address identify, in binary form, the bin associated with the address. The masking operation is preferably performed by shifting the address to the left and then to the right an appropriate number of bits.

The bit masking method 300 is simple and fast. The number of bins, however, is determined by the value of the N most significant bits in the highest valid address of the disk drive. For example, if the 6 most significant bits in the highest valid address are 100001, which represents 33 in decimal, then the method 300 will only map to 34 bins (bins 0 to 33). The value of N can be increased to increase the number of bins.

2. Division Method

Figure 4:
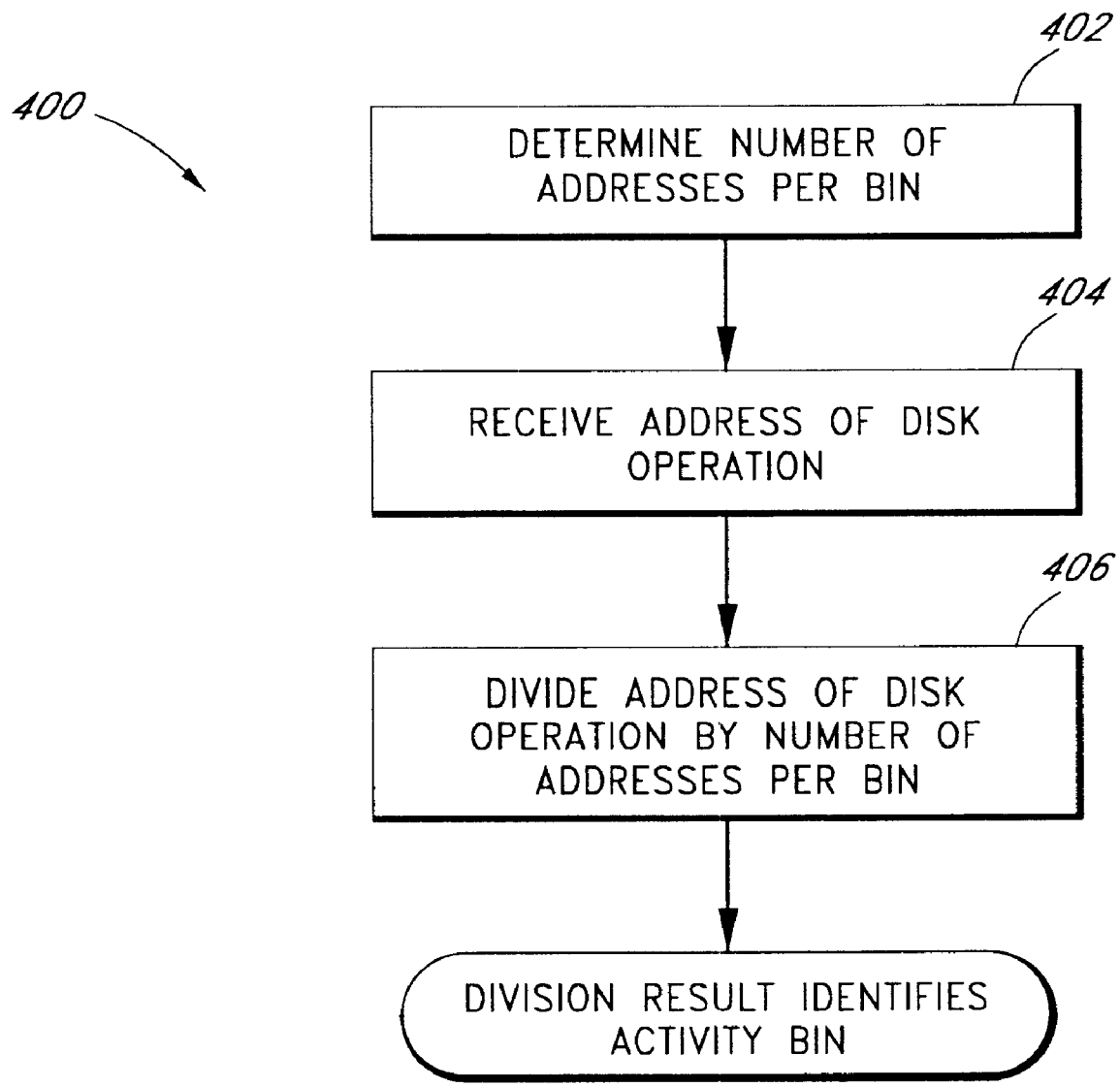
FIG. 4 illustrates another method for mapping disk addresses to activity bins.

FIG. 4 illustrates a division method 400 for mapping disk addresses to activity bins. At a step 402, the number of valid disk addresses per bin is determined preferably by dividing the number of valid disk addresses by the number of activity bins. The division is preferably performed with sufficient precision to produce an even distribution of addresses among activity bins. Increased precision will generally result in a more even distribution. The step 402 need only be performed once, such as during the initialization or setup of a system.

At a step 404, the address of a disk operation is received. At a step 406, the address of the disk operation is divided by the number of disk addresses per bin. The division is preferably again performed using real arithmetic, but the result is preferably rounded down to the nearest whole number. The result of the division is the activity bin associated with the disk address.

The division method 400 is substantially slower than the bit masking method 300 since it involves two divisions. Divisions are fairly costly operations relative to masking and shifting operations. The division method 400, however, allows any number of bins to be used. The valid disk addresses are associated evenly, to the extent possible, across the bins.

3. Lookup Table Method

Figure 5:
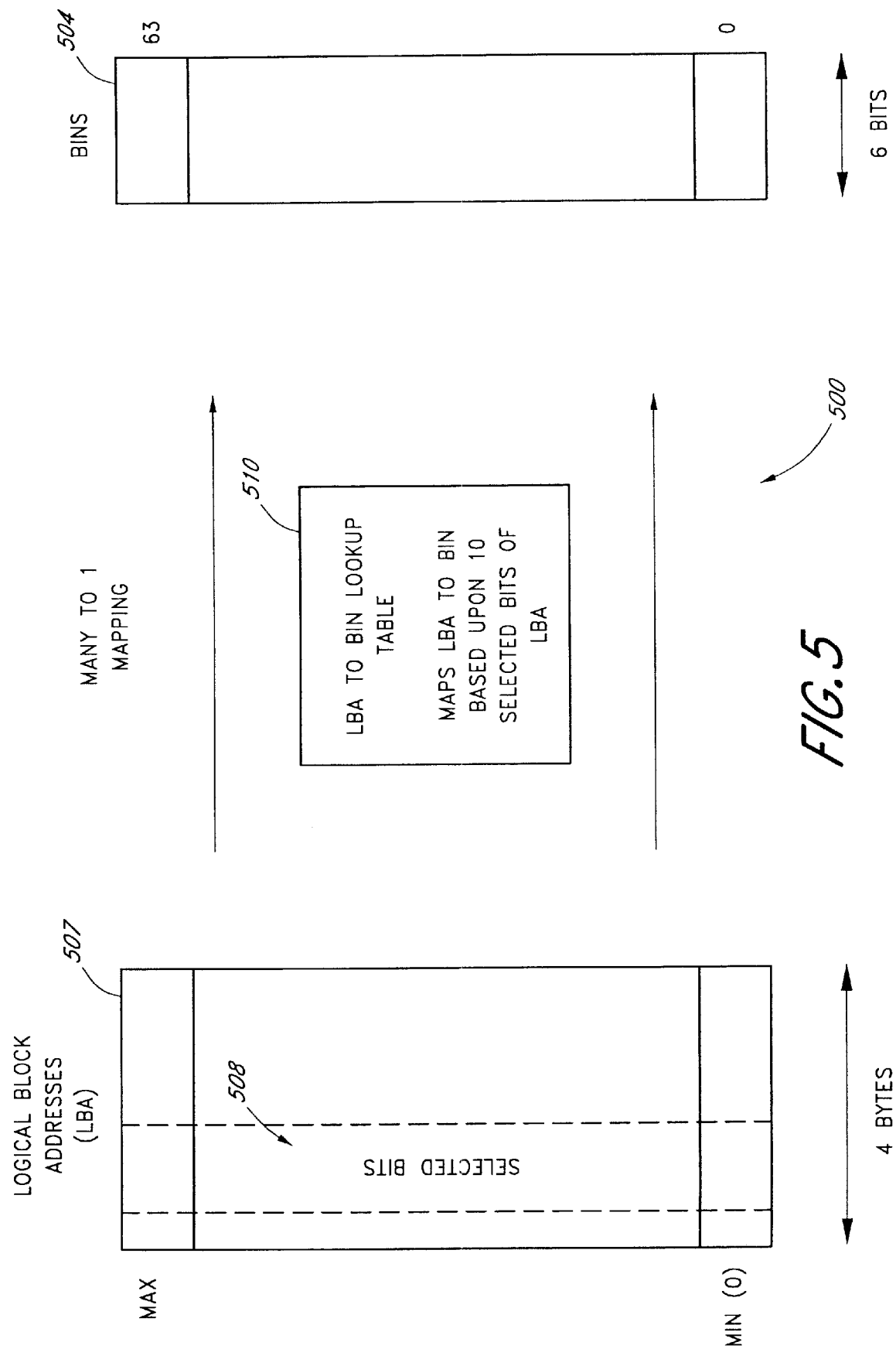
FIG. 5 illustrates a mapping of disk addresses to activity bins through a lookup table that can be used to achieve the benefits of the division method with the speed of the bit masking method.

FIG. 5 illustrates a mapping 500 of disk addresses 502 to activity bins 504 that can be used to achieve the benefits of the division method 400 with the speed of the bit masking method 300. The mapping 500 is defined by an LBA to bin lookup table 510 that maps selected bits 508 of LBAs to bins.

The selected bits 508 are preferably the bits in the bit positions of the N most significant bits of the highest valid LBA. In one embodiment, N is 10, which allows up to 1024 different combinations of selected bits. The actual number of valid combinations of the selected bits will depend upon the value of the highest LBA of the disk drive. As will be understood by one skilled in the art, the 10 most significant bits of the highest LBA will always yield a value between 512 and 1023. In one embodiment, between 513 to 1024 combinations of the selected bits are mapped to 64 bins such that at least 8 and at most 16 combinations of selected bits are mapped to each bin.

The selected bits are preferably mapped to bins evenly, such that each bin has at most one more combination of bits mapped to it than any other. As opposed to the bit masking method 300, the mapping 500 allows all of the bins to be used in addition to evenly mapping the addresses to bins.

Figure 6:
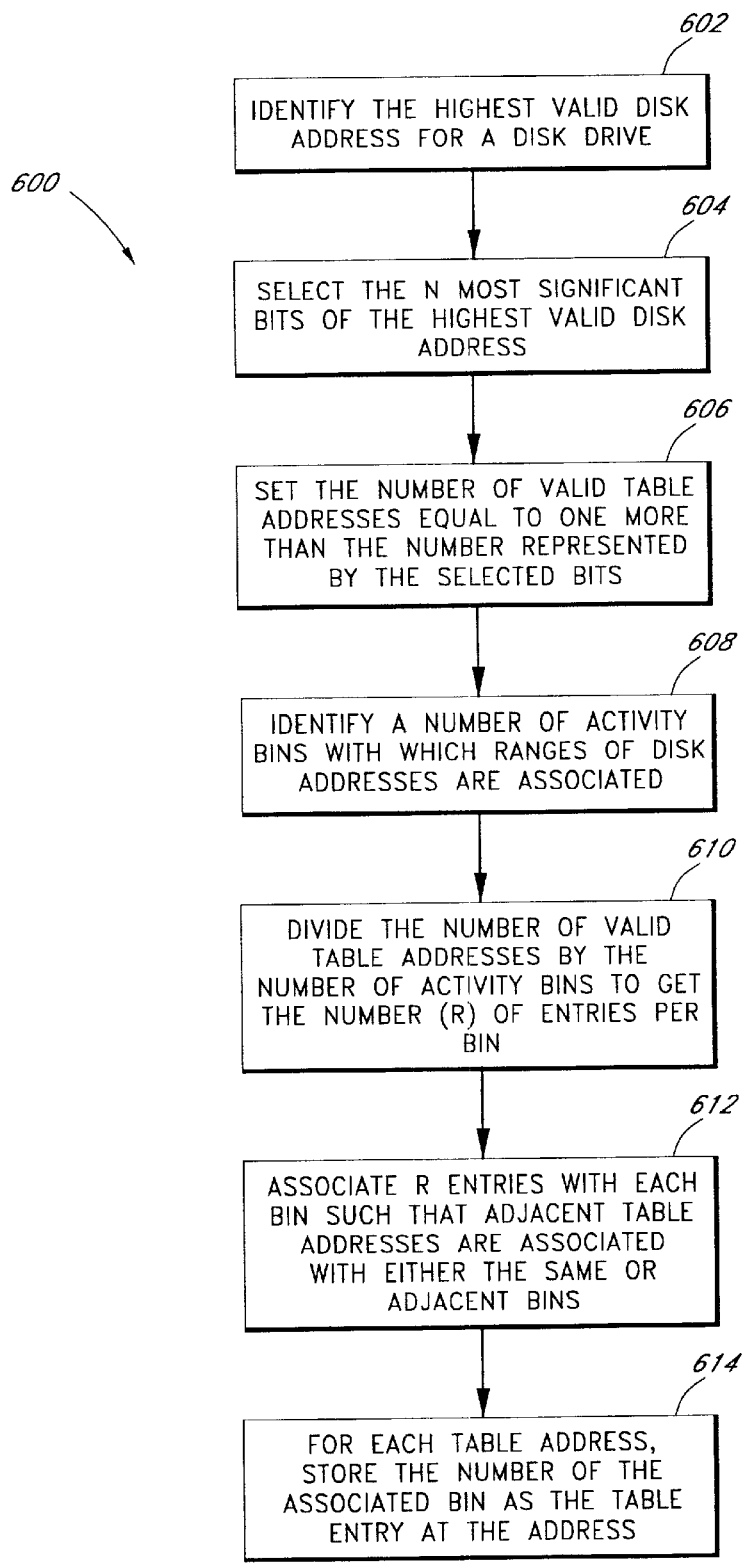
FIG. 6 illustrates a method for creating the lookup table.

FIG. 6 illustrates a method 600 for creating the lookup table 510 in accordance with one embodiment. The method assumes that an empty table 510 is available having $2^{10}$ locations (e.g., locations 0 to 1023). Each location is capable of identifying a bin, which requires 6 bits for 64 bins.

The method 600 may be performed in any of several situations. If an array controller 220 is manufactured to function in conjunction with a particular model or size of disk drive, the method may be performed by the manufacturer of the disk array to create the table once for use in any number of products. In this case the table is preferably created in advance and loaded into the ROM 226 (FIG. 2) of the array controller 220. Alternatively, the array controller 220 may be configured to accept various sizes or models of disk drives in which case it may be desirable to configure the array controller 220 to perform the method 600 upon startup, initialization, or during a setup procedure. During system operation, the lookup table is preferably stored or cached in the RAM 228 to allow quick access.

At a step 602 of the method 600, the highest valid disk address of the disk or disks is identified. At a step 604, the N most significant bits of the highest valid disk address are selected. To select these bits, a shifting or masking technique can be used such as is described in the step 306 of the method 300.

At a step 606, the number of valid table addresses is set equal to one more than the number represented by the selected bits. This is the case since addresses use 0-based numbering. In the present embodiment, the number of valid table addresses will be between 513 and 1024, depending upon the address of the highest valid address of the disk. Accordingly, in most cases, not all of the addresses in the table 510 will be used.

At a step 608, a number of activity bins are identified. Each of the activity bins is to be associated with a range of disk addresses. In present embodiment, 64 activity bins are each identified by a binary number, e.g. 000000 to 111111.

At a step 610, the number of valid table addresses is divided by the number of activity bins to get the number of addresses or table entries, (hereinafter R, for ratio) that are mapped to each bin. The division is preferably performed with sufficient precision to produce an even distribution of table addresses among activity bins. Increased precision will generally result in a more even distribution. At a step 612, R table addresses are mapped to each bin such that adjacently ordered table addresses are associated with either the same or adjacently ordered bins. The table addresses are mapped by entering the number of the associated bin in the table entry at the respective table address. The mapping maintains the relative order of entries in the bins to which the entries are mapped.

The division of the step 610 may yield a non-integer number for the ratio R. An integer number of entries, however, must be mapped to each bin. Accordingly, in the case that R is not an integer, some bins may have R rounded up the next whole number entries associated with them and some bins may have R rounded down to the previous whole number entries associated with them. For example, if there are 513 table entries and 64 activity bins, there will be 8.015625 entries per bin. Accordingly, one of the activity bins will have 9 entries mapped to it and the remaining 63 activity bins will have 8 entries mapped to each of them. If there are 1024 table entries, each of 64 activity bins will have exactly 16 entries mapped to it.

At a step 614, for each table address, the number of the associated bin is stored in the table 510 at the respective table address. The resulting table 510 provides a many to one mapping of the selected bits of each LBA to bins. The mapping allows all of the bins to be used and is a substantially even mapping. Any bin will have at most one more table entry mapped to it than any other bin. In present embodiment, since each bin will have at least 8 entries mapped to it, the worst case ratio of numbers of entries per bin is 8 entries for some bins to 9 entries for other bins.

Figure 7:
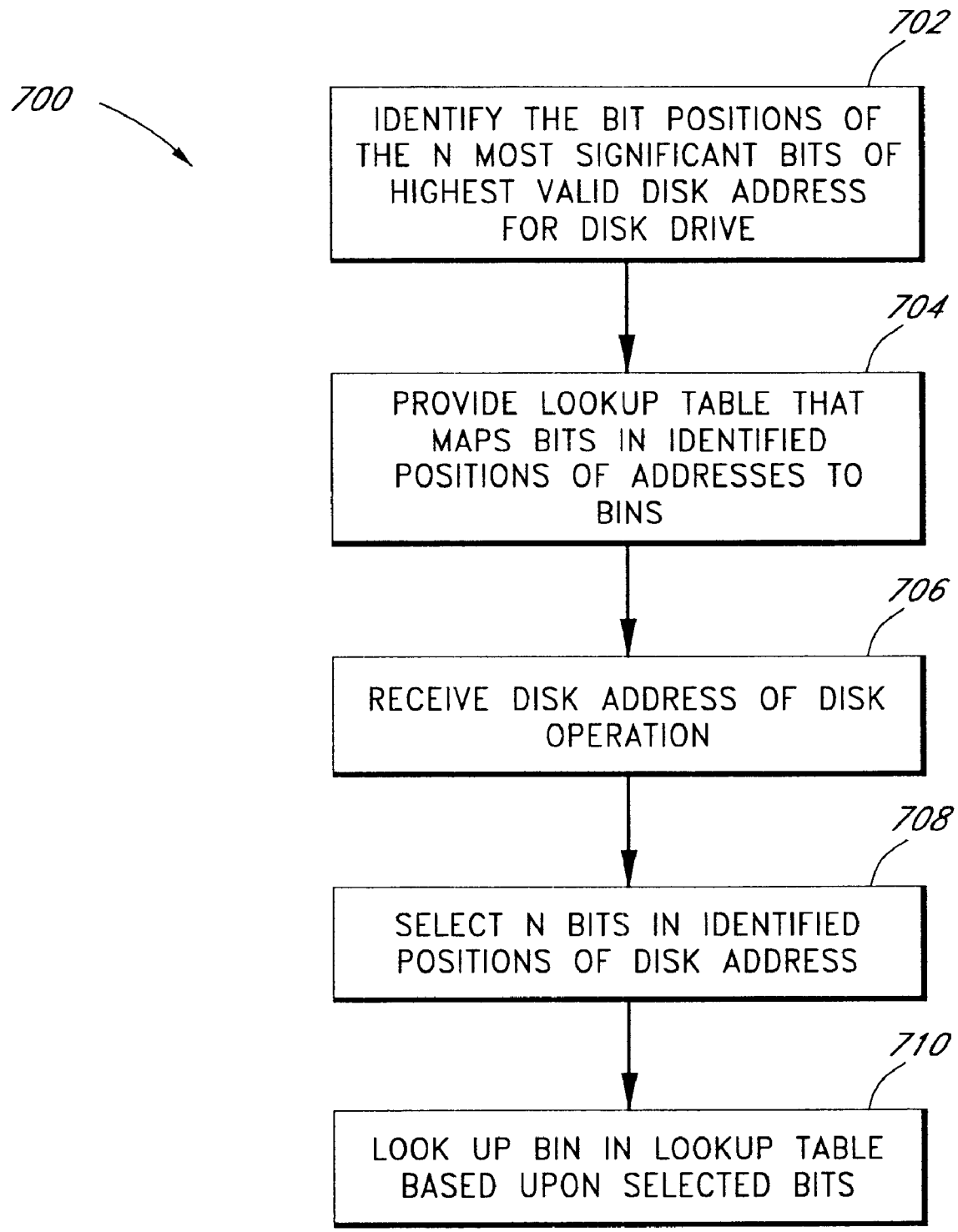
FIG. 7 illustrates a method for associating disk addresses with activity bins using a lookup table.

FIG. 7 illustrates a method 700 for associating disk addresses with activity bins using a lookup table in accordance with one embodiment. The method 700 is preferably performed by the array controller microprocessor 124 (FIG. 1).

At a step 702, the bit positions of the most significant N bits of the highest valid disk address for the disk drive are identified. These bit positions are the same bit positions selected in the step 604 of the method 600 and serve as an index to the table created in the method 600. At a step 704, the bin lookup table 510 is provided, preferably in accordance with the method 600.

At a step 706, the disk address of a disk operation is received. At a step 708, the N bits in the identified positions are selected from the disk address. To select these bits, a shifting or masking technique can be used such as is described in the step 306 of the method 300. At a step 710, the bin is looked up in the table 510 using the N selected bits of the disk address as an index into the table.

IV. Reducing Rebuild Times After a Power Loss

This section discusses one aspect of the invention in accordance with which activity bins are used to reduce rebuild times after power failures in a RAID array. Power failures can affect the array, the host system, or both the array and the host system. This aspect provides an increase in performance over previous technology by keeping track of the portions of the array that have been written to during a limited time interval previous to the power loss, and rebuilding only those portions when power is restored.

A. Problem Description

One problem with existing RAID arrays relates to maintaining the consistency of a RAID stripe or mirror when a disk write operation is interrupted as a result of a power failure. The consistency problem occurs even when all write caching is permanently disabled. If a write is in progress when power fails a write operation may not complete, leaving an array in an inconsistent state. For example, one half of a RAID 1 mirror may be written, while the second half is not. In a RAID 5 set, one or more of the non-parity disks may be written without writing the parity disk and as a result the parity disk may become out of sync. If inconsistencies are allowed to remain, verification programs may fail, implicating hardware that is really functioning properly. In RAID 1, an inconsistent mirror makes it possible for a program to read data multiple times and get different results depending on which half of the mirror supplies the data. With RAID 5, a stripe may have some portion belonging to the interrupted I/O, as well as other unrelated data.

Figure 8:
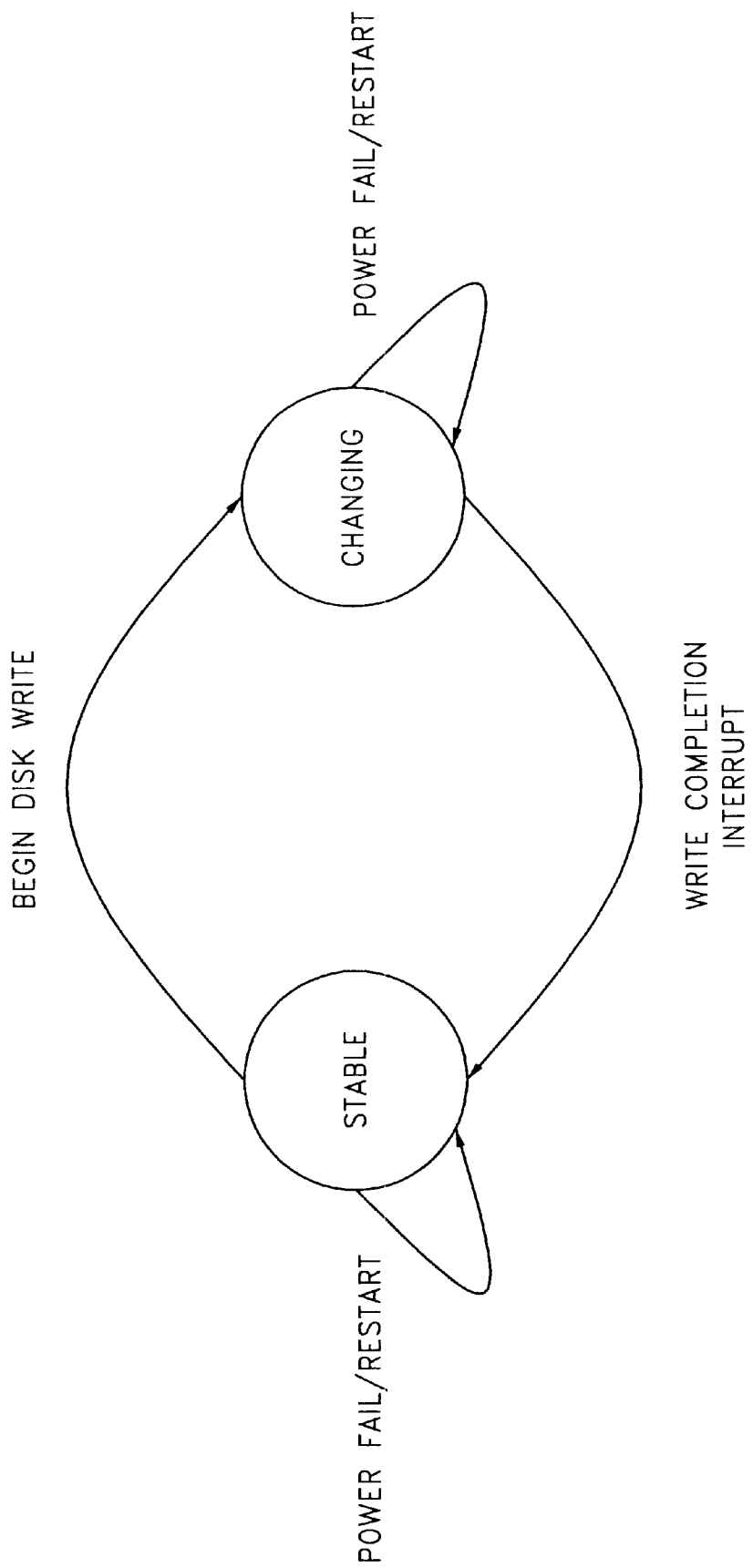
FIG. 8 illustrates a state transition diagram that depicts states of data stored on an array in order to reduce rebuild times after power failures.

FIG. 8 illustrates a state transition diagram that depicts states of storage locations on an array in accordance with one embodiment. A Stable state is preferably used to identify addresses that are guaranteed to be consistent. Addresses that have been written and for which a write completion interrupt has been provided to the host are in a Stable state. A Changing state is preferably used to identify addresses that are the target of a write operation that may have been only partially completed. Addresses for which a write operation has been received or initiated, but for which a write completion interrupt has not been sent to the host are in a Changing state. Addresses in a Changing state are preferably considered suspect of having an inconsistent parity or mirror. Any addresses in a Changing state are preferably rebuilt to restore consistency once power is restored.

When a power failure occurs while some data is in the Changing state, no application programs should attempt to read from locations that were targets of uncompleted writes after power is restored. In this situation, it is unknown whether these locations contain the old data, new data, or some combination thereof. Even if applications do not depend on either the old or the new data, mirrors or stripes should not remain inconsistent.

While no correct application should regard either copy of Changing storage as "good," some utility programs may depend on it staying the same through multiple reads. A more serious problem is that if a drive fails with some storage in the Changing state, the inconsistent stripe prevents all data from that stripe from being accessed correctly.

Theoretically, it should be possible to revert to the old data in all situations, but this cannot be done by the RAID system alone without a significant compromise in performance. The SCSI specification does not require each I/O to be atomic in this way. Host applications or databases that require this property enforce this atomicity at a higher level.

B. Prior Techniques For Maintaining RAID Consistency

Previous RAID controllers handle the situation in different ways. Some low cost storage systems just ignore the problem in which case an UPS may be required in order to maintain system integrity. Other systems detect an "unclean shutdown" by setting a bit in nonvolatile storage (e.g., on a disk) during normal operation, and clearing it when the operating system shuts down normally. If power is lost, the unclean-shutdown bit remains set and can be used to initiate a rebuild of the entire RAID array.

Rebuilding after an unclean shutdown is a simple way to make stripes consistent. In RAID 1, one drive assumes the roll of master, and the other drive is written to make it match the master. In RAID 5, the parity is recomputed and rewritten based on the other (data) portions of the stripe. The problem with rebuilding the entire volume is that it can take many hours to complete. During that time, the performance is lower for normal operation and the volume is susceptible to single failures.

C. Logging of Outstanding Writes

One way to reduce rebuild times is to record the details of each write operation in the nonvolatile memory. The amount of data to be recorded includes the starting address (LBA), ending address or length of the write, and the volume where the write is directed. This requires about 9 bytes of data times the maximum number of outstanding I/Os. For example, a maximum of 256 outstanding I/Os requires about 2304 bytes of data. This scheme works if the memory is large enough, and if the nonvolatile write time is short enough to avoid impacting the write times. Writing all of the information allows the recovery time to be at its absolute minimum.

After a power failure, the only storage that is rebuilt is preferably the storage that was being modified at the time of the power failure. With 256 outstanding I/Os, the recovery time would require 3 seconds at 10 ms per I/O, but there is little difference between the 3 seconds and a recovery of a few minutes because the rebuild happens in the background and does not delay the start of other processing.

D. Use of Activity Bins

Another approach to reducing rebuild times is to use activity bins, as described above, to record only the general areas or address ranges of the disk to which writes are performed. The states of the activity bins are stored in a binmap 184 in nonvolatile memory. If power fails, the write history can be retrieved from the binmap 184 and used to rebuild activity bins or address ranges that may have been modified inconsistently. When power is restored, only activity bins containing Changing data need to be rebuilt.

1. Writing to the Binmap

Figure 9:
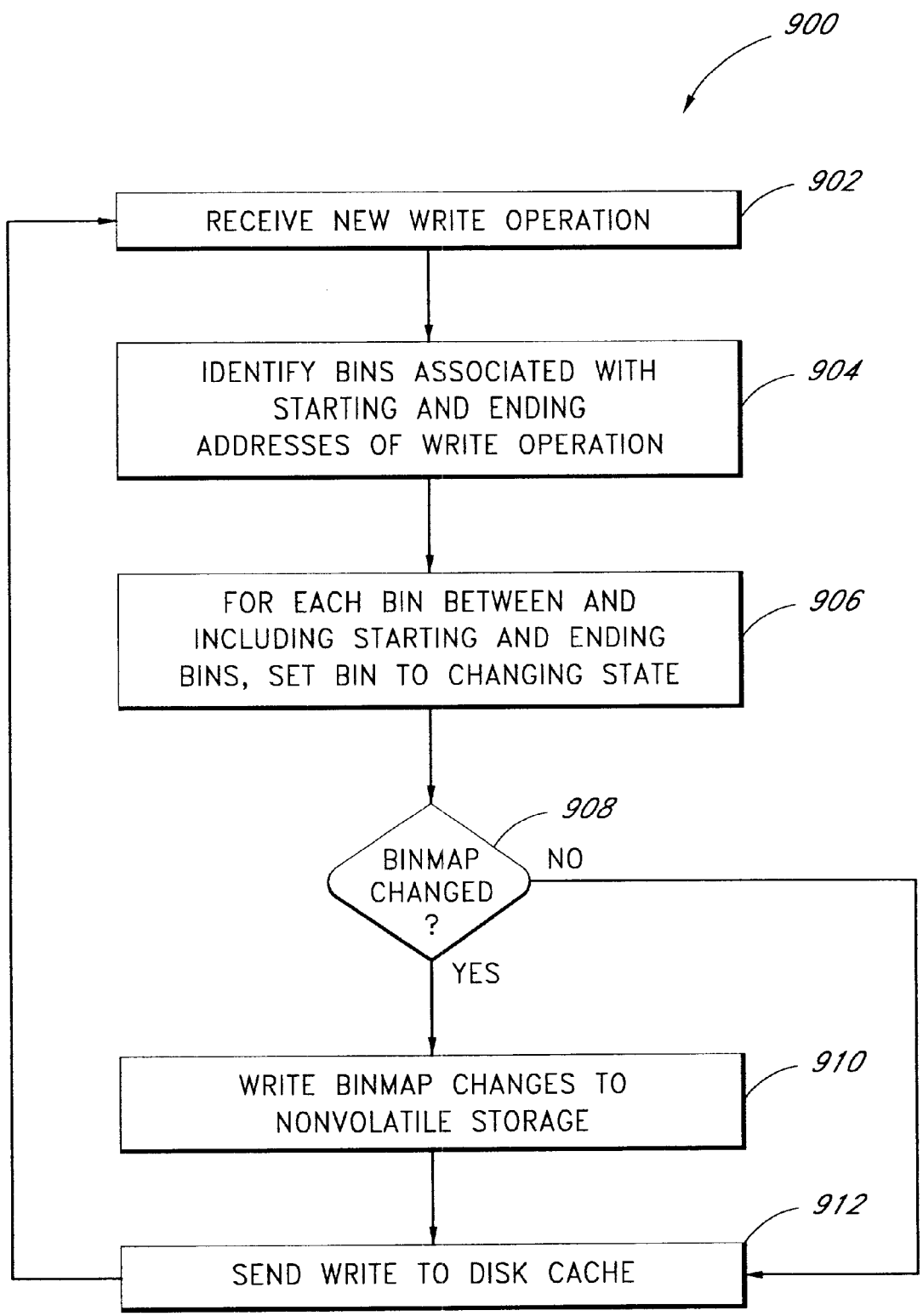
FIG. 9 illustrates a method for updating a binmap with disk activity information.

FIG. 9 illustrates a method 900 for updating a binmap 184 with disk activity information. The method is preferably performed by the array microprocessor 124, but may be performed by another processor or a dedicated microcontroller (e.g., an ASIC).

At a step 902, a new write operation is received, preferably from the host system 102.

At a step 904, the microprocessor 124 identifies bins associated with the starting and ending addresses of the write operation. The bins are preferably identified in accordance with one of the methods presented in Section III above.

At a step 906, for each bin between and including the starting and ending bins, the state of the bin in the binmap 184 is set to Changing. In most cases, depending upon the size of the bins, the starting and ending addresses will be mapped to the same bin and therefore the state of only one bin needs to be checked and/or modified.

At a step 908, the microprocessor determines whether the bitmap has changed as a result of the write operation. If the bin(s) being written to have not been written to previously since the binmap was last cleared, then the binmap will have changed. In this case control flows to a step 910. Otherwise, if the bin(s) being written to have already been written to since the binmap was last cleared, then there will be no change to the binmap. In this case, control flows to a step 912.

At the step 910, since the copy of the binmap stored in RAM 128 has changed in relation to the copy stored in the NOVRAM 180, the NOVRAM 180 binmap is updated to reflect the changes.

At the step 912, the microprocessor sends the write data to the write cache or the disk for writing to the disk media. Control then returns to the step 902.

2. Clearing the Binmaps

Unless the binmaps are periodically cleared, the number of bins set to the Changing state will continue to increase over time, making rebuild times longer and longer. Accordingly, to maintain the short rebuild times, the binmaps can be periodically cleared (reset to Stable) once it can be determined that writes have completed successfully.

In one embodiment, the binmap is cleared in conjunction with a delayed cache flush, which is described in Section II above. Alternatively, a drive flush can be issued prior to clearing the binmap even without using the deferred flush optimization aspect. After drives have been flushed, all of the writes are presumed to have been completed. Accordingly, the array will be in a consistent state after a drive flush. Since all of the bins are in the Stable state, the binmap 184 can be cleared such that all of the bins are set to Stable.

In the case drive flushes are not used, another mechanism is preferably used to periodically reset the binmaps. In one embodiment, a set of two "ping-pong" binmaps is used. On every disk write, both binmaps are checked to see if this is the first write to the address range. If either target bin is Stable, both bins are changed to Changing and committed to nonvolatile storage before the normal disk write is begun. If both bins are already in the Changing state, then the write is performed in the usual way.

A timer is set to go off at a period substantially guaranteed to be greater than the maximum time it takes a write operation to complete, such as 10 minutes. Each binmap is cleared on alternating timer interrupts. Each binmap is therefore cleared every 20 minutes, but there is always at least 10 minutes of valid write history in one of the binmaps.

After a power failure, the binmap that was least recently cleared can be used to identify the bins to be rebuilt. One advantage of this embodiment is that it does not require any forced flushing of in-progress I/Os, which means that there is no impact to performance in the normal case.

3. Rebuilding After Power Failure

Figure 10:
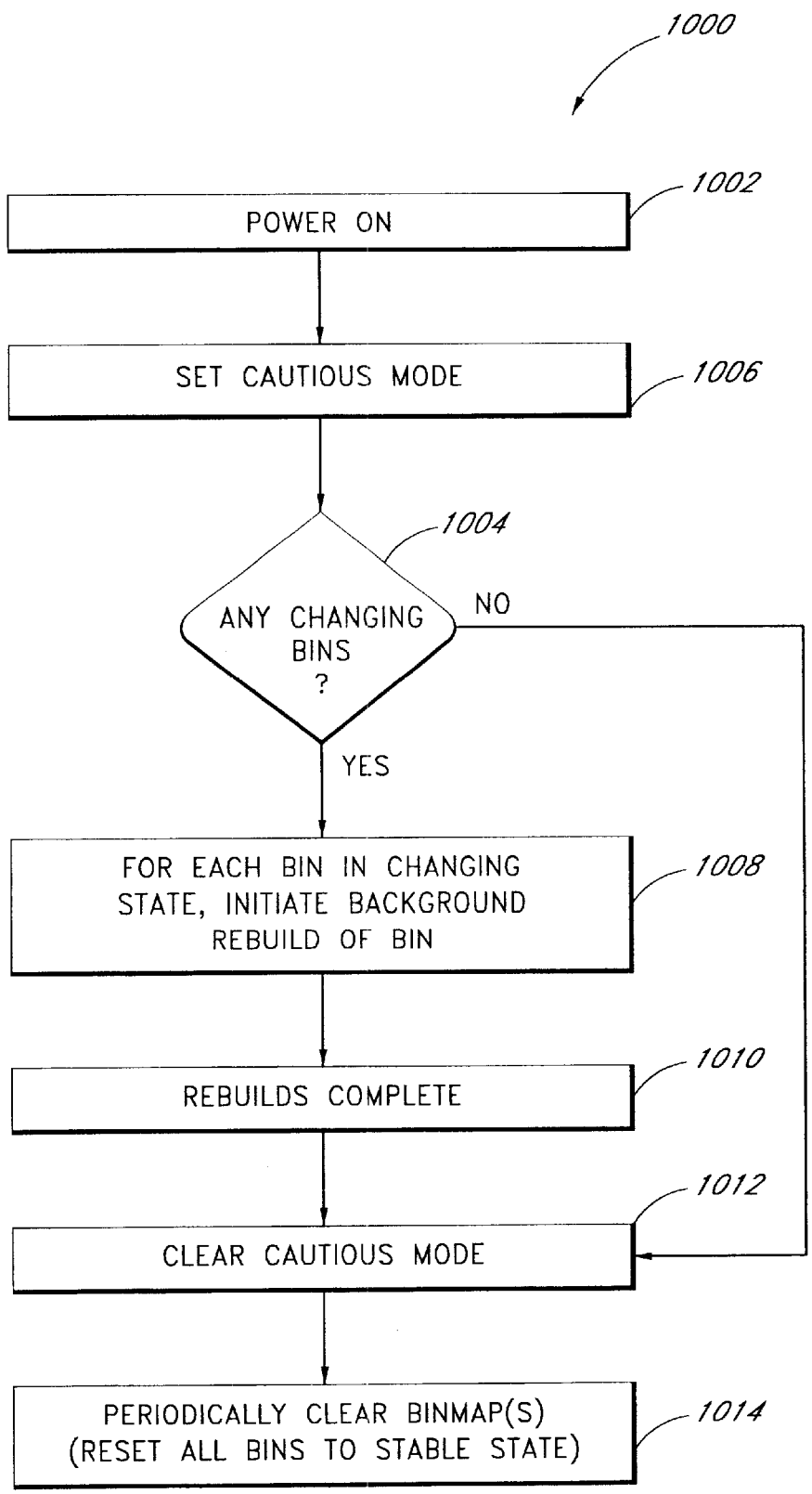
FIG. 10 illustrates a method for utilizing the data in a binmap to restore consistency to the array after a power failure.

FIG. 10 illustrates a method 1000 for utilizing the data in a binmap 184 to restore consistency to the array 100 after a power failure. The disk array 100 can be powered off, either intentionally or due to a power failure at any step of the method 900. At a step 1002, the array is again powered on.

At a step 1004, the microprocessor 124 sets the array in a "cautious" mode. While in the cautious mode, the array may contain inconsistent volumes or may be rebuilding inconsistent volumes. Accordingly, while the array is in the cautious mode, the binmap(s) are not cleared. The normal clearing of the binmaps after flushes and/or after timeouts is suspended until the cautious mode has been exited.

At a decision step 1006, the microprocessor determines whether any bins are in the Changing state. If so, the array was probably shut down due to a power failure. Bins in the changing state may contain inconsistent stripes and need to be rebuilt, and in this case control passes to a step 1008. If no bins are in the Changing state, control passes to a step 1012.

At a step 1008, for each bin in the binmap 184 that is in a changing state, the array 100 initiates a background rebuild of the bin. For a RAID 1 array, the bins of the master drive are copied to the mirror drive. Accordingly, only the bins in the changing state need be copied, rather than the whole drive. For a RAID 5 array, the parity is recomputed and rewritten for any stripes within bins in a Changing state.

In accordance with this approach, a RAID 1 system can come up immediately. During the rebuild period, however, RAID 1 reads are forced to the master drive either for all reads or just for Changing-bin reads.

At a step 1010 the rebuilds of the Changing bins are completed. At a subsequent step 1012 the cautious mode is cleared.

At a step 1014, once the cautious mode is cleared, the microprocessor can begin periodically clearing the binmap or binmaps. The microprocessor preferably clears the binmaps by resetting all of the bins to the Stable state as described in the previous subsection.

4. Performance

In an application where a single sequential write is in progress at the time of power failure, a 64-bin implementation will speed up the rebuild time by about a factor of 64. In an 8-drive RAID 10 using 75 GB drives, a full rebuild of the 300 GB volume would take on the order of 2.7 hours (at 30 MB/s). This embodiment with 64 bins reduces the time to 2.6 minutes. With 4 kbits of memory, the rebuild time for a single bin drops from 2.6 minutes to just 2.4 seconds. Note that in many cases, there will be no writes in progress at the moment power is removed. In those cases, the nonvolatile memory reduces the rebuild time to zero (or the rebuild can be skipped altogether).

The added processing burden associated with managing the binmaps should have little or no measurable performance impact on the disk array. The amount of nonvolatile memory can be extremely small (e.g. 1 bit for each activity bin), since there is no need to record details of any writes, and because writes to nearby regions of memory do not require separate storage.

The performance impact of using the disk configuration block (DCB) as the NOVRAM in conjunction with the ping-pong binmap clearing scheme is very small. For example, if 1000 bins are used, even if all 1000 bins are modified between timer interrupts, the impact would be 1000 additional disk writes of 10 ms, or 10 seconds out of every 10 minutes, or 1.66% of the disk throughput. But this case should be extremely rare, and normally only a few bins are dirtied each time period, making the performance impact negligible.

V. Reducing Unit Creation Times

This section discusses one aspect of the invention in accordance with which activity bins are used to reduce unit creation times. In addition, this aspect enables a reduction of rebuild times after a RAID drive failure or a drive replacement. This aspect provides an increase in performance over previous technology by zeroing activity bins on demand or in the background and by rebuilding only portions of the unit that contain valid data.

A. Bin States

In accordance with one embodiment, instead of a single bit per bin to indicate Stable/Changing states, a second bit is added to give the following 4 states for each bin:

Empty—this bin has never been written since the array unit was created or initialized;

Zero—every sector of this bin has been zeroed by the firmware, but no normal writes have been made to any sector in this bin;

Changing—at least one write is in progress to a sector in this bin; and

Stable—there are no pending writes to this bin, and at least one normal write has been completed to an address in this bin.

In one embodiment, the states are maintained in a memory element by two binary bits as follows: Empty (01), Zero (00), Changing (10), and Stable (11).

Figure 11:
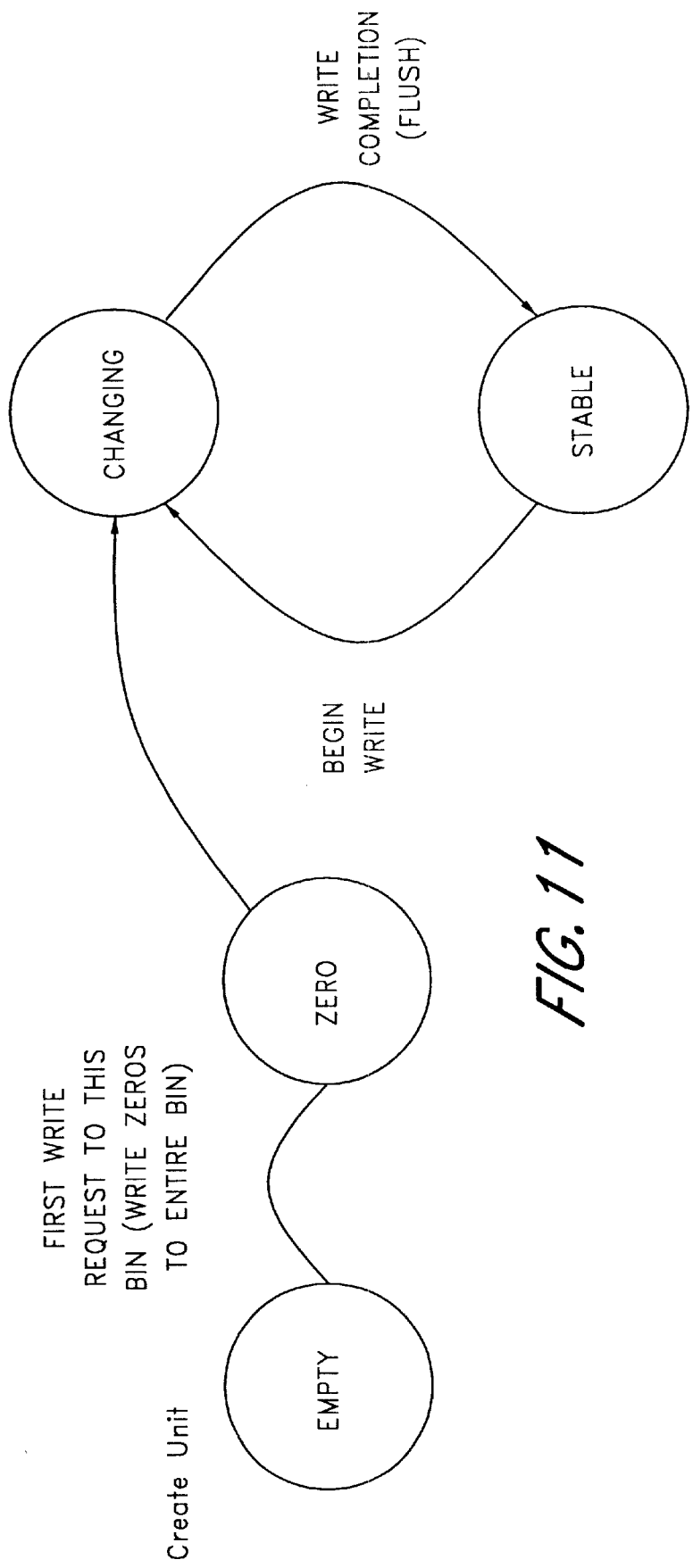
FIG. 11 illustrates a state transition diagram for four bin states used to reduce drive failure rebuild times.

FIG. 11 illustrates a state transition diagram for these four states. Upon creation of an array unit, all bins are initialized to the Empty state. An array unit is created when the array and its disk drives are first prepared for use to store data.

Once a first write request directed to a particular bin is received, all of the array addresses associated with the activity bin are first zeroed (set to 0) before the write is performed. The bin is then set to the Zero state by setting the associated storage element in the binmap. Until a bin is first written to, RAID consistency is not a concern since the bin contains no valid data and need not be rebuilt upon a drive failure. Once a bin contains valid data, however, the data stripes in the bin must be consistent in order to enable rebuilds of the bin.

In order to make a bin consistent, the value of all of the data for a bin must be known. Accordingly, all of the data in the bin should be either read or written. Since it takes as long to read the data as to write it, all of the storage in a bin is preferably set to zero before a first write. As a result, writing of the mirror or parity disk during the zeroing operation involves no additional computation as opposed to copying a mirror or determining and writing a parity. In the case of a RAID 1 mirror, both halves of the mirror will be zero. In the case of a RAID 5 array, all of the disks including the parity disk will be zero.

Once the first write to a bin has begun (sent to disk or cache), the state of the bin is set to Changing. The Changing and Stable states have the same characteristics as described with reference to FIG. 8 in Section IV. Data that has been written and for which a write completion interrupt has been provided to the host is in a Stable state. Data for which a write operation has been received or initiated, but for which a write completion interrupt has not been sent to the host is in a Changing state.

At unit creation time, the states of all the bins are preferably set to Empty by setting the corresponding storage elements in the binmap. Depending upon the write time of the NOVRAM and the size of the binmap, the binmap can be set in less than a second and possibly less than a millisecond. Since the array need not be zeroed before becoming operational, unit creation overhead can be reduced from minutes or hours to less than a second.

Before a first write to any bin is completed, the bin is first zeroed and the corresponding memory element in the binmap is set to the Zero state. In addition, bins can be converted from empty to zero by writing zeros to the bins' storage addresses in the background with the unit operational. A background task can be configured to gradually zero all bins. In this case, full performance is obtained automatically typically within an hour or so after the unit is created.

After a drive failure, drive removal, or drive replacement, only the bins in the stable or changing states need to be rebuilt. In a RAID 1 array, data is copied to the stable or changing bins from the mirror. In a RAID 5 array, the data to be stored in the stable or changing bins is determined based upon the parity of the remaining drives. Once the data is stored on the replaced drive, the rebuilt bins are set to stable. The remaining bins for the replaced drive are set to the Empty state.

This aspect of the invention greatly decreases the unit creation time. Unit creation times can be decreased from hours to a fraction of a second. This aspect also improves the rebuild time for volumes with little real data. The rebuild process looks at the state of each bin to determine whether a data copy is needed. When a new drive is added, if the state of the bin is Empty or Zero, the new state can be set to Empty and no data is copied. If the state is Stable or Changing, the data is copied to the new drive and the state set to Stable.

B. Fast Unit Creation Method

Figure 12:
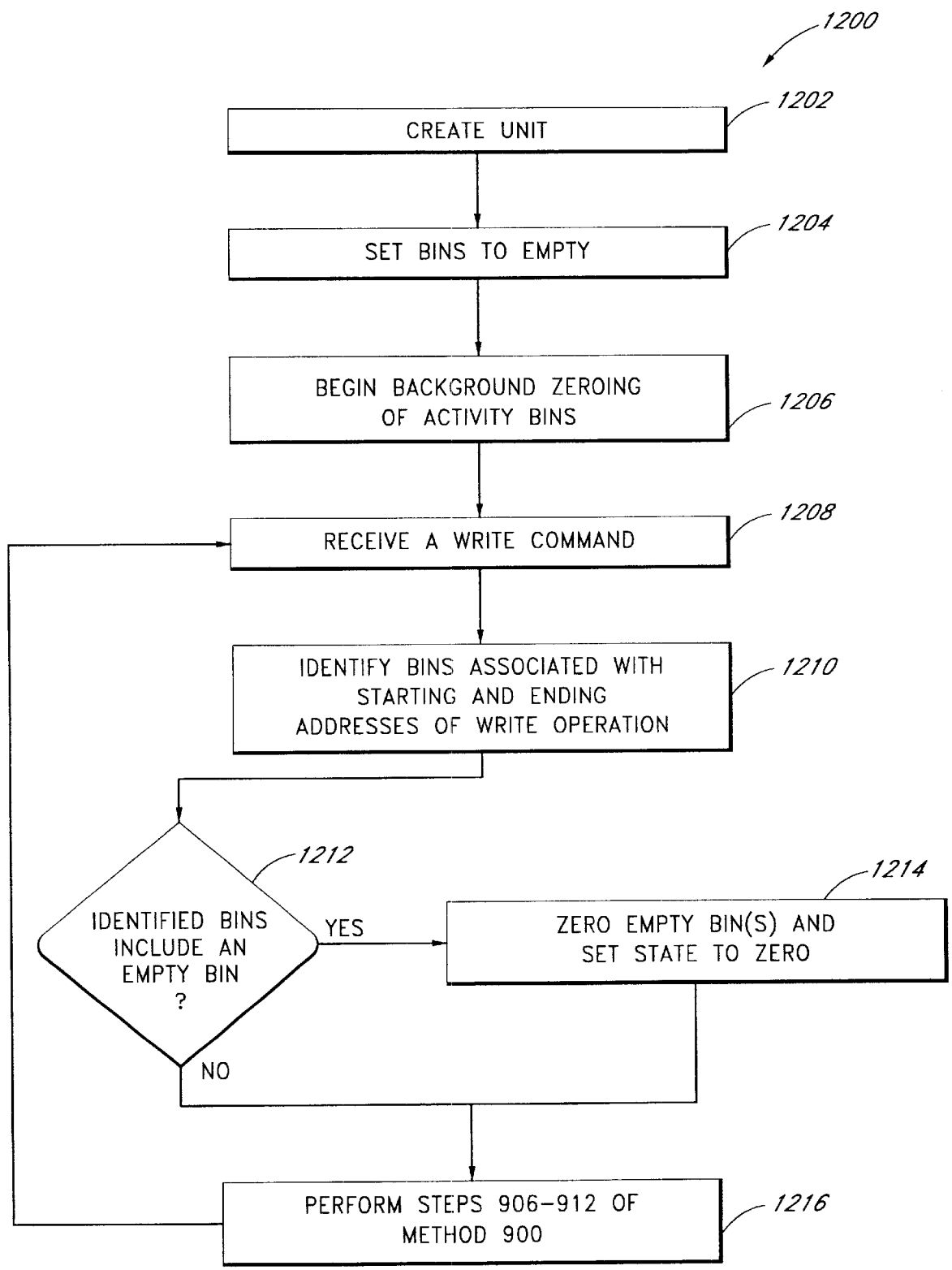
FIG. 12 illustrates a method for reducing rebuild times after a drive failure.

FIG. 12 illustrates a method 1200 for reducing unit creation times and completing write operations in accordance with one embodiment. The method is preferably performed by the array microprocessor 124.

At a step 1202 an array unit is created and initialized. During the unit creation process, the drives or the array need not be zeroed.

At a step 1204, the bins of the array unit are set to Empty in the binmap.

At a step 1206, the array begins a background task that zeroes bins and sets their states to Zero. The background task continues until all bins are zeroed.

At a step 1208, the array receives a write command from the host system.

At a step 1210, the microprocessor 124 identifies bins associated with the starting and ending addresses of the write operation. The bins are preferably identified in accordance with one of the methods presented in Section III above.

At a step 1212, the microprocessor determines whether any of the identified bins are Empty. If so control passes to a step 1214. Otherwise, control passes to a step 1216.

At the step 1214, the microprocessor zeros the empty bins identified in the step 1210 and sets the state of the zeroed bins to Zero. From the step 1214, control also passes to the step 1216.

At the step 1216, the steps 906 through 912 of the method 900 (FIG. 9) are performed. These steps handle the writing of data and the setting of the state of the target bins to Changing and the Stable. After the step 1216, control returns to the step 1208 for the processing of another write command.

C. Additional Methods

Figure 13:
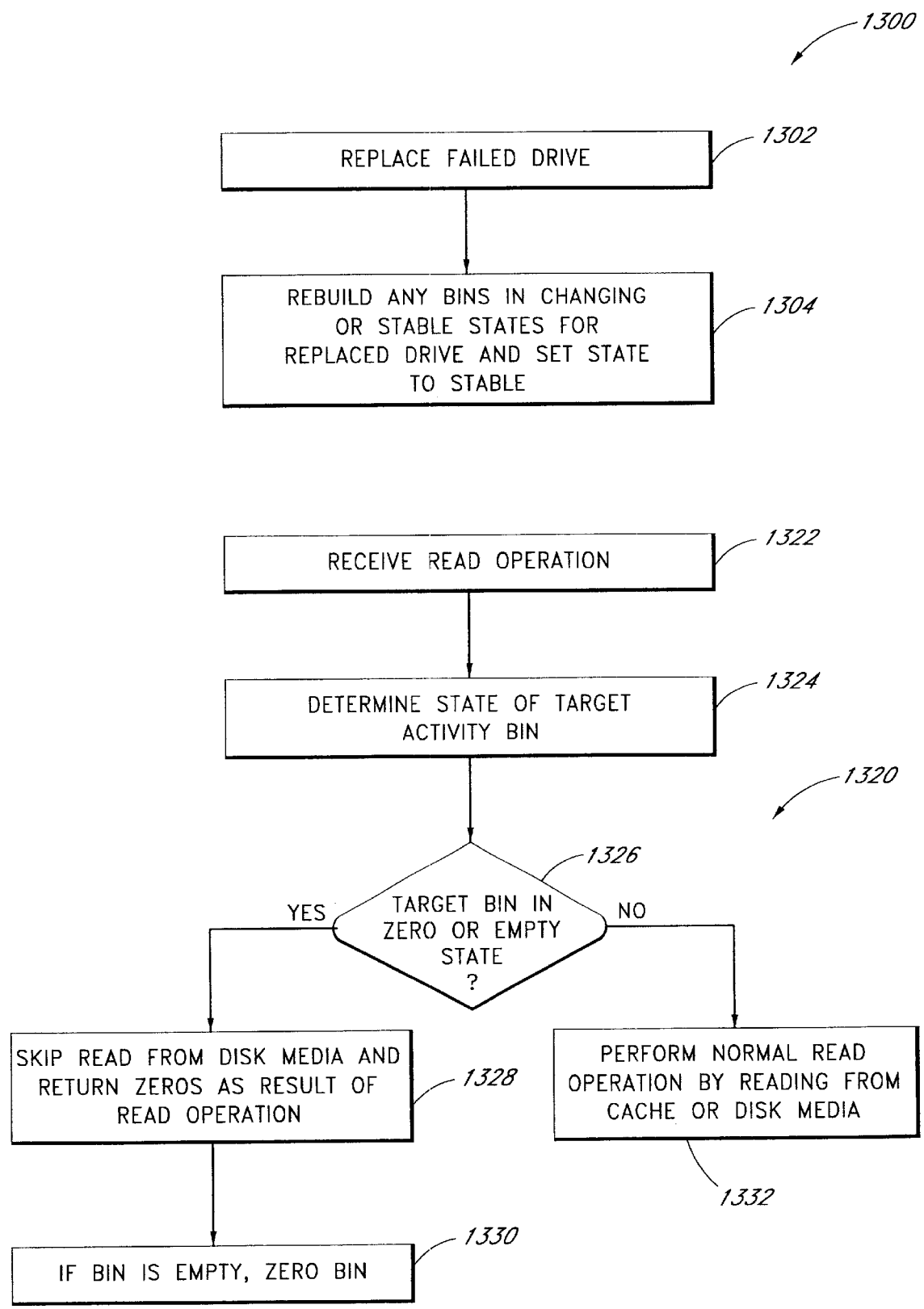
FIG. 13 illustrates a method that provides reduced rebuild times after a drive failure, and a method that provides improved read performance for certain read operations.

FIG. 13 illustrates a method 1300, which provides reduced rebuild times after a drive failure, and a method 1320 which provides improved read performance for certain read operations.

The method 1300 is performed after a drive failure. A drive failure typically results in the loss of all the data stored on the failed drive. The lost data, however, can be recovered from a mirror drive (RAID 1) or based upon the remaining drives and/or parity drive (RAID 5). At a step 1302 the failed drive is replaced. At a step 1304, any bins that were in the changing or stable states for the replaced drive are rebuilt and the states of these bins are set to Stable in the binmap. The rebuilding of any bins in the Empty state can be skipped. In one embodiment, any bins in the Zero state can be also be skipped during the rebuild process and their states can be reset to Empty. Alternatively, bins in the Zero state can be again zeroed on the replaced drive, however, this can be done in the background. The method 1300 allows a reduction in rebuild times roughly in proportion to the amount of unwritten space available on the array.

The method 1320 can be performed to increase the performance of certain read operations. In one embodiment, a read from an activity bin in a Zero state can be configured to return zeros without having to do a read of any disk media. A read of an Empty bin can be configured to return zeros or an error. The read of the Empty bin can also be configured to start a zeroing process of the bin in anticipation of subsequent reads. Reads of Stable or Changing bins can be executed normally with data being retrieved directly from a cache or from the disk media.

At a step 1322 a read operation is received that is directed to a range of target addresses. At a step 1324 the target addresses are mapped to one or more activity bins and the states of the activity bins are determined. At a decision step 1326, if the state of a target activity bin(s) is Empty or Zero, control flows to a step 1328. At the step 1328, zeros are returned as the result of the read operation. At a step 1330, if the target activity bin(s) are in the Empty state, the target activity bin(s) can be zeroed, possibly using a background process, in anticipation of future reads targeted to the bin. If, at the decision step 1326, the state of the target activity bin is not Empty or Zero, control flows to a step 1332. At the step 1332, a normal read operation is performed in accordance with the RAID implementation by reading data from a cache or from the disk media.

D. Performance

In one configuration the controller can control 1 terabyte of storage and can write at 100 MB/s. If 64 bins are used, each bin has just over 30 MB, and zeroing a bin takes about ⅓ second. Upon unit creation and before all bins are zeroed in the background, if a program performs random writes to a different bin each time, the program would initially have a performance of about 3 I/Os per second until the bins have all been zeroed. Even with 90 outstanding I/Os, the average wait time is under 30 seconds. The number of outstanding I/Os can be restricted during the zeroing time if necessary to assure that no I/Os time out. A more typical case would be a sequential write or read/write mix, in which case only an occasional I/O would cross into a new empty bin and incur the extra ⅓ second zeroing delay.

When a failed drive is replaced, the rebuilding of Empty or Zero bins can be skipped, a substantial reduction in rebuild time can be achieved when an array is substantially empty.

In one embodiment, an option can be provided to allow an entire new drive or array to be zeroed immediately upon creation. This option allows occasional delays involved in zeroing bins to be avoided.

As will be understood by one skilled in the art, zeroing is performed to initiate compliance with a RAID standard. Other methods, such as rebuilding, can alternatively be used to initiate compliance with a RAID standard. Accordingly, in alternative embodiments, activity bins can be rebuilt rather than zeroed.

The embodiment described in Section IV can also be used in conjunction with the additional Empty and Zero states to reduce rebuild times after a power failure. As described with reference to the step 1008 of the method 1000, only the Changing bins need be rebuilt after a power failure. Bins in Empty, Zero, and Stable states can be skipped.

VI. Conclusion

As will be understood by one skilled in the art, the various aspects of the invention described in the sections above can be combined in various combinations in one or more embodiments to achieve the combined benefits of the various aspects. In one embodiment, Deferred Flush Write Optimization is combined with the aspects related to reducing rebuild times for both power failures and drive failures.

U.S. patent application Ser. No. 09/634,744, which was filed on Aug. 9, 2000 and the disclosure of which is hereby incorporated by reference, discloses a system and methods for spatially displaying disk drive activity data. As will be understood by one skilled in the art, circuitry, firmware, and methods used to monitor disk activity in accordance with the present application can be used for the dual purpose of updating an activity binmap and updating a display in which display elements represent activity bins.

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow. In method claims, reference characters are used for convenience of description only, and do not indicate a particular order for performing a method.

What is claimed is:

1. A method for reliably writing data to a disk drive, the method comprising:
    (a) receiving a write command from a host system;
    (b) storing, in a cache, write data that is associated with the write command and that is to be written to the disk drive;
    (c) storing an identification of the write command;
    (d) flushing the cache to force cached write data to be written to disk media;
    (e) in response to (d), retrieving the stored identification of the write command; and
    (f) sending a completion interrupt to the host based at least upon the retrieved identification of the write command, whereby the completion interrupt is not sent to the host if a power loss interrupts the completion of the write command after the write data is stored in the cache but before the write data is written to disk media.

2. The method of claim 1, further comprising repeating (a), (b), and (c) a plurality of times before performing (d).

3. The method of claim 1, wherein the identification is stored in a queue.

4. The method of claim 3, further comprising, in conjunction with retrieving the identification, removing the identification from the queue.

5. The method of claim 1, further comprising:
    (g) determining that a command has not been received from the host system within a predetermined amount of time after (a); and
    (h) performing (d) in response to (g).

6. The method of claim 1, further comprising:
    (g) determining that at least a predetermined number of read commands have been received have been received since (a) without an intervening write command; and
    (h) performing (d) in response to (g).

7. The method of claim 1, further comprising:
    (g) determining that at least a predetermined amount of time has passed since (a); and
    (h) performing (d) in response to (g).

8. The method of claim 7, wherein the write command received in (a) is the first write command received since the cache was last flushed.

9. The method of claim 1, wherein the cache is a disk drive write cache.

10. The method of claim 1, wherein the cache is an array write cache.

11. A method for reliably writing data to a disk drive, the method comprising, on a disk drive controller, for write operations for which write data has been cached by the controller, deferring transmission to a host system of write completion interrupts for the write operations until a cache flush of the write data has been completed, and repeating a cache flush when a command is not received from the host system within a predetermined amount of time after a receipt of a previous command.

12. A method for reliably writing data to a disk drive, the method comprising:
    caching write data of write operations received from a host system;
    deferring transmission to a host system of write completion interrupts for the write operations until after any cached write data has been written to a disk medium;
    determining that a command has not been received from the host system within a predetermined amount of time after a receipt of a previous command; and
    performing a cache flush in response to the determination, wherein the cache flush causes any cached write data to be written to the disk medium.

* * * * *